H. R. CLARK.
VERTICALLY ADJUSTABLE HAND TRUCK.
APPLICATION FILED JULY 24, 1919.
1,343,864.
Patented June 15, 1920.
4 SHEETS—SHEET 1.
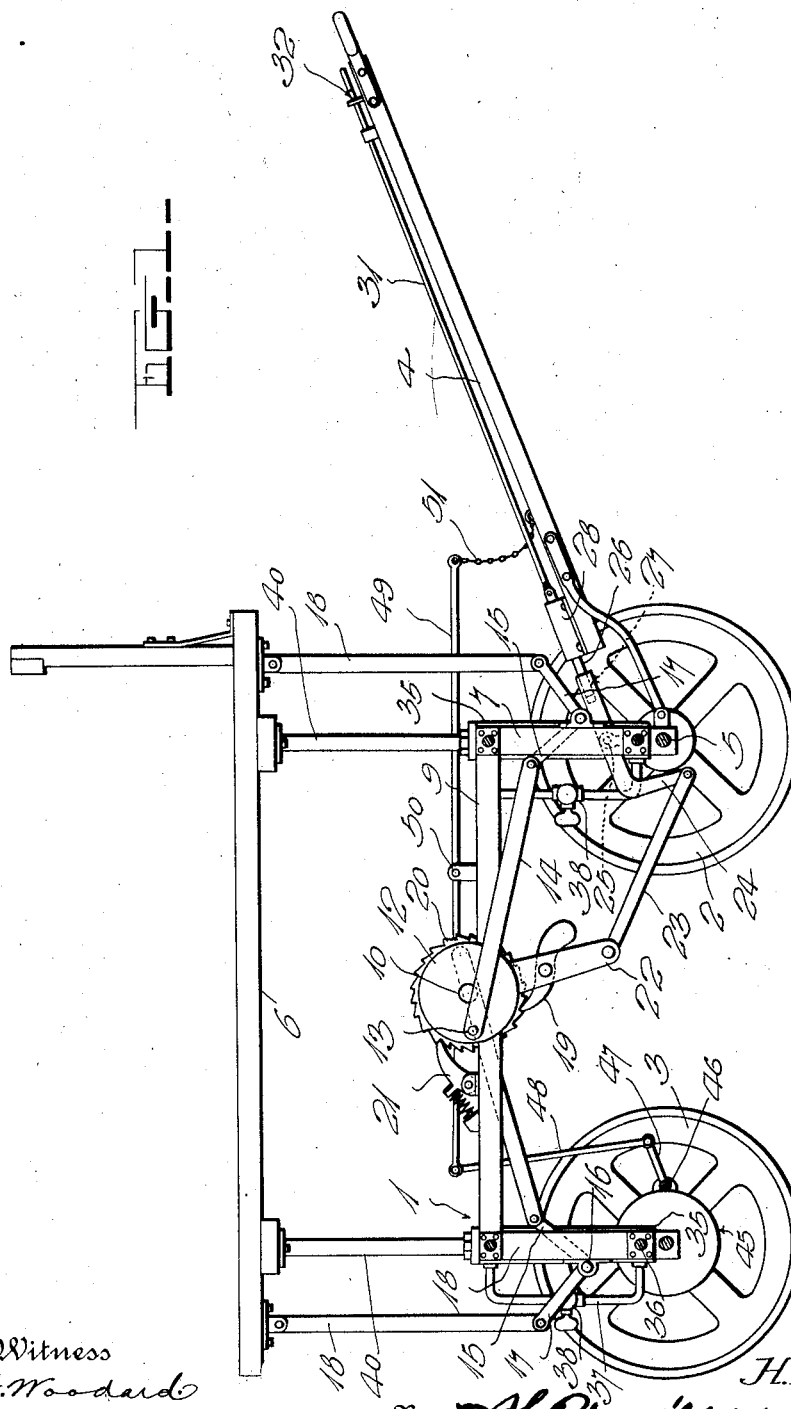
Witness
H. Woodard
Inventor
H. R. Clark
By H. R. Wilson & Co.
Attorneys

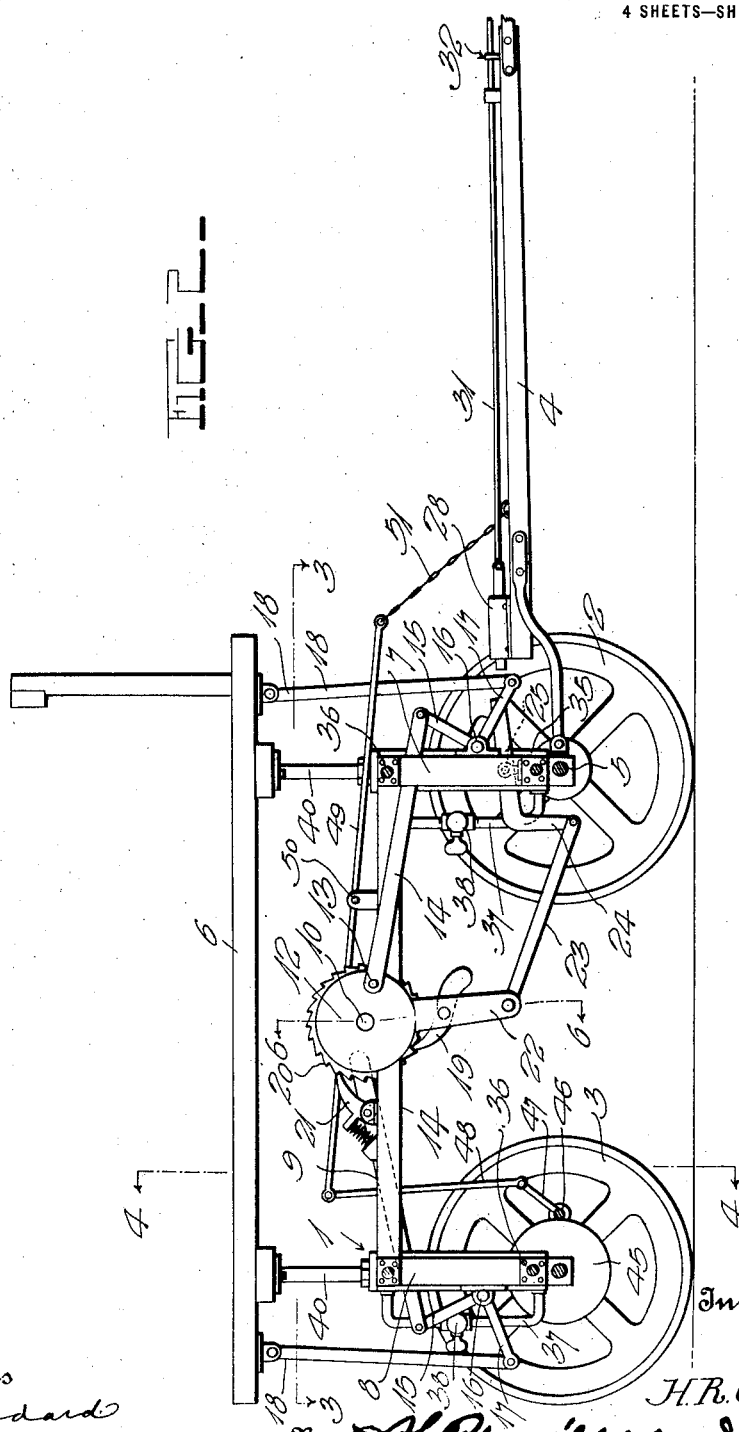

H. R. CLARK.
VERTICALLY ADJUSTABLE HAND TRUCK.
APPLICATION FILED JULY 24, 1919.
1,343,864.
Patented June 15, 1920.
4 SHEETS—SHEET 3.
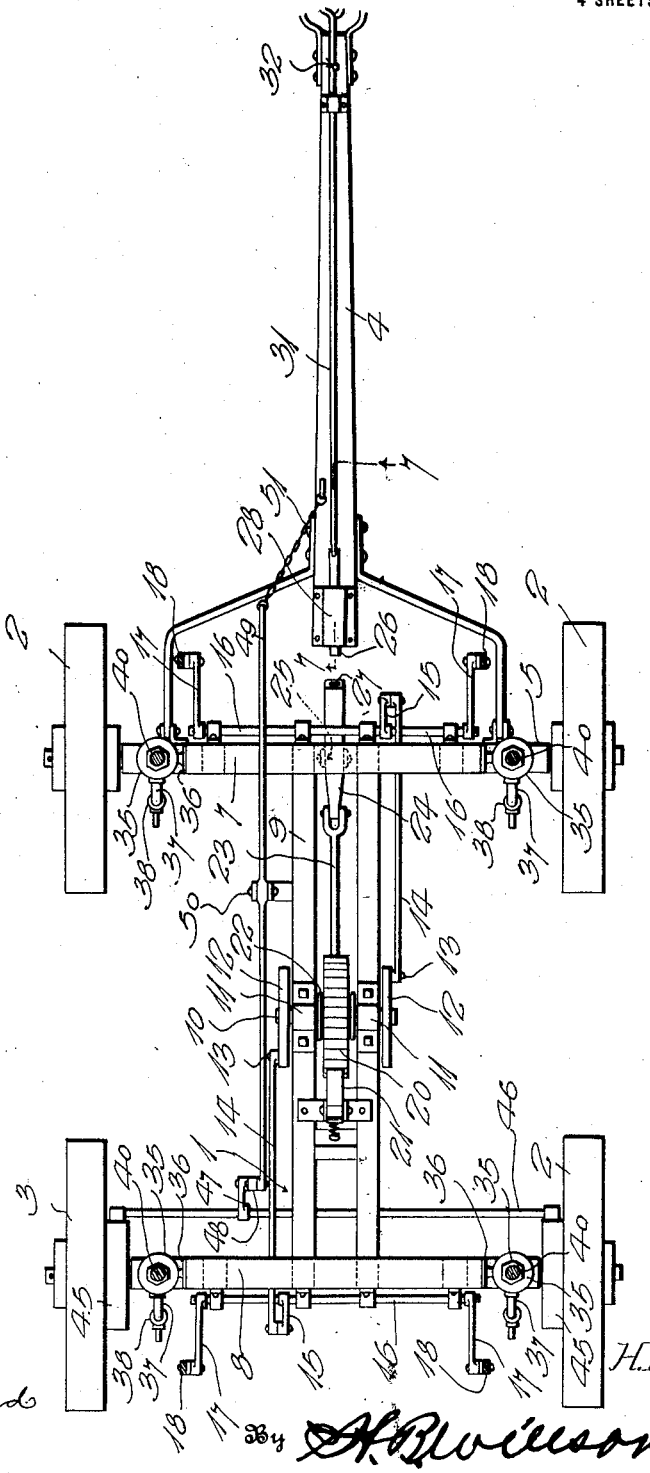
Witness
H. Woodard
Inventor
H. R. Clark
By
Attorneys

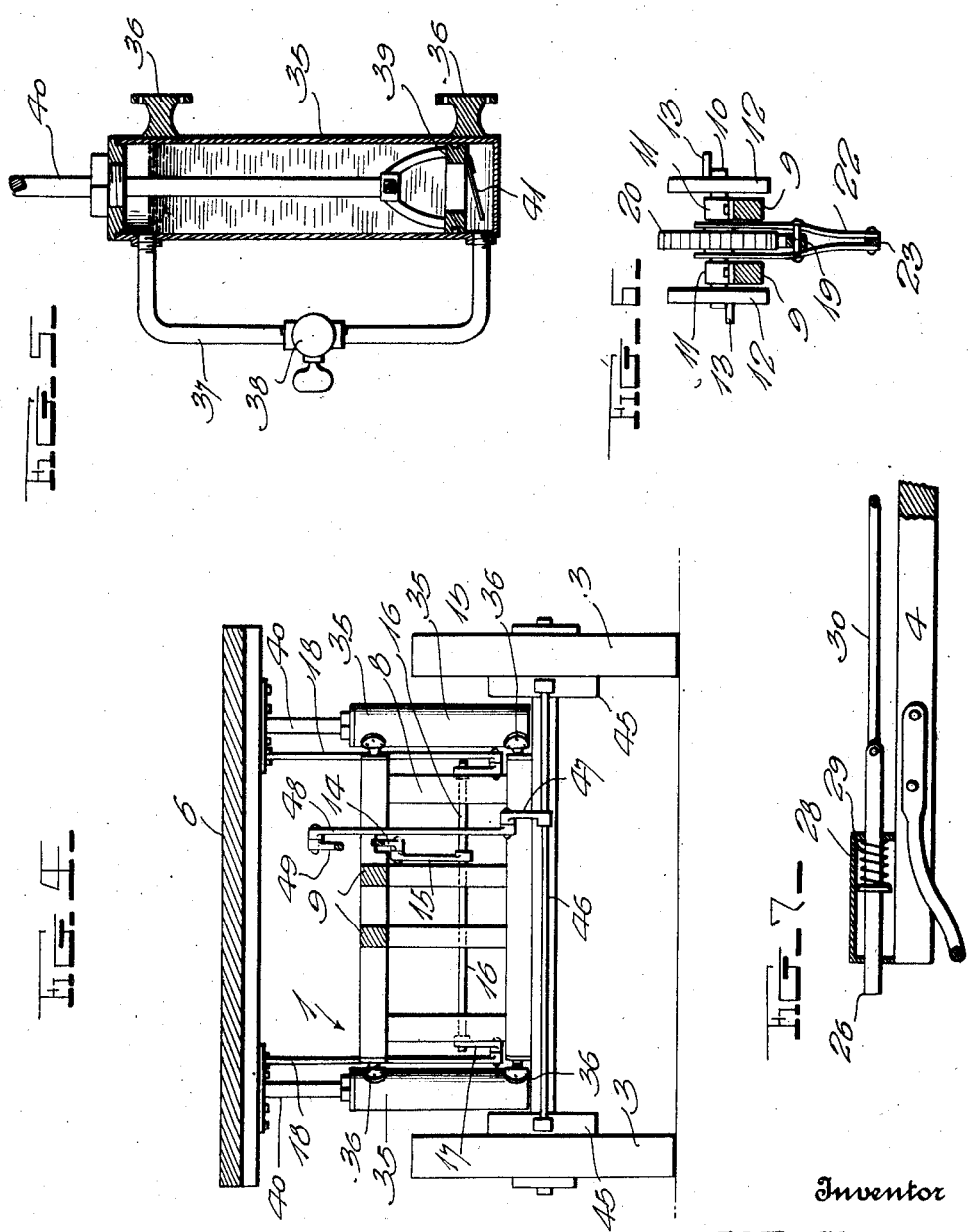

UNITED STATES PATENT OFFICE.

HARRY R. CLARK, OF GOLDEN CITY, MISSOURI.

VERTICALLY-ADJUSTABLE HAND-TRUCK.

1,343,864.　　　　　Specification of Letters Patent.　　Patented June 15, 1920.

Application filed July 24, 1919. Serial No. 313,098.

*To all whom it may concern:*

Be it known that I, HARRY R. CLARK, citizen of the United States, residing at Golden City, in the county of Barton and State of Missouri, have invented certain new and useful Improvements in Vertically-Adjustable Hand-Trucks; and I do declare the following to be a full, clear, and exact description of the invention, such as will enable others skilled in the art to which it appertains to make and use the same.

My invention relates to improvements in trucks and more particularly to those of the type used in railway terminals and in warehouses for handling baggage, boxes and the like.

One object of the invention is to provide a truck whose load carrying platform may be vertically adjusted by oscillating the tongue, thereby allowing said platform to be positioned at the most advantageous level for loading or unloading, this being of particular advantage when the truck is used for carrying baggage to and from railway cars.

Another object is to provide a truck having a novel brake mechanism controlled by movement of the tongue, so that the speed of said truck may be readily controlled when traveling down inclines or whenever it is necessary to check its speed.

Yet another object is to provide a truck of the type set forth which will be comparatively simple and inexpensive, highly efficient and reliable in use, and easily manufactured.

With the foregoing in view, the invention resides in the novel features of construction and in the unique combinations of parts hereinafter fully described and claimed, the descriptive matter being supplemented by the accompanying drawings.

Figure 1 is a side elevation of a truck constructed in accordance with my invention, showing the platform raised and the brakes released.

Fig. 2 is a longitudinal section showing the platform lowered and the brakes applied.

Fig. 3 is a horizontal section on the plane of line 3—3 of Fig. 2.

Fig. 4 is a vertical transverse section on the plane indicated by line 4—4 of Fig. 2.

Fig. 5 is a vertical section through one of the dash-pots employed for checking the descent of the platform.

Fig. 6 is a detail vertical section on the plane of line 6—6 of Fig. 2.

Fig. 7 is a detail longitudinal section as indicated by line 7—7 of Fig. 3.

In carrying out my invention, I mount a suitable frame 1 upon front and rear wheels 2 and 3; provide a tongue 4 for turning the front axle 5 to steer the machine; employ means operable by vertical oscillation of the tongue 4, for adjusting the height of the load carrying platform 6; and equip the truck with a novel brake mechanism also controlled by the tongue 4.

The several features of the invention may be embodied in numerous forms, and I have disclosed the structure described below, for illustrative purposes only.

The frame 1 as shown, consists of front and rear vertical frames 7 and 8 rising from the front and rear axles of the truck and connected by two longitudinal beams 9. A transverse shaft 10 is rotatably mounted in suitable bearings 11 on the beams 9 and carries suitable crank means, such as the disks 12 and wrist pins 13, said crank means being connected by longitudinal links 14 with crank arms 15 on transverse rock shafts 16 which are suitably mounted on the front and rear frames 7 and 8. The ends of the shafts 16 are provided with other crank arms 17, and lifting bars 18 rise from said arms to the platform 6. By this means or an analogous arrangement of parts, rotation of the shaft 10 will raise and lower the platform 6 as required.

For turning the shaft 10, I prefer to provide a pawl 19 and a ratchet 20, and a dog 21 may be used to hold said ratchet against retrograde rotation. The pawl 19 is preferably mounted on an oscillating lever 22 which may well be bifurcated and fulcrumed on the shaft 10 between the beams 9, as shown more clearly in Fig. 6. I have shown a connecting rod 23 extending forwardly from the lower end of lever 22 and connected with a bell crank 24 which is fulcrumed on the front frame as seen at 25. Lever 24 forms part of coacting means on the tongue and the truck frame for establishing an operative connection between said tongue and the raising means for the platform 6, and I prefer to embody the other part of said coacting means in the form of a longitudinal bolt 26 slidably mounted on the tongue 4 and capable of reception in a socket 27 in the front end of lever 24. The bolt 26 may well slide through a suitable casing 28 on the tongue 4, and I prefer to provide a spring 29 in said casing having a tendency to project the bolt rearwardly. A control rod or the like 31 however extends forwardly from the bolt 26 along the tongue, and any suitable means 32, such as a notch and a pin, may be provided for holding said rod normally against rearward shifting. The bolt 26 is then free of the socket 27 as illustrated in Figs. 2 and 3. When in this condition, the truck may be pulled from place to place in the usual manner, but whenever the platform 6 is to be raised or lowered, the bolt 30 is projected into the socket 27 as seen in Fig. 1, and by then vertically oscillating the tongue 4, the parts 24, 23, 22, 19 and 20 will rotate the shaft 10 to operate the platform elevating mechanism.

To lower the platform, the pawl 19 and the dog 21 are released and said platform then descends by gravity, and to prevent rapid descent of said platform and possible injury to the operator or the articles supported by the truck, I prefer to employ dash-pots such as detailed in Fig. 5. One of these dash-pots is located at each end of the frames 7 and 8 and although they may be of any adequate construction, I prefer to employ the arrangement shown. A vertical cylinder 35 is provided with suitable attaching means 36 and the upper and lower ends of said cylinder are placed in communication by a by-pass 37 having a control valve 38. It is intended that the cylinder shall be filled with oil and that the piston 39 shall operate in such oil to be checked in its downward movement thereby. The piston 39 is provided with a piston rod 40 which is secured to the platform 6. I prefer to equip the piston with an upwardly closing check valve 41 so that the ascent of the platform will not be retarded any appreciable extent. However, when said platform starts on its descending movement, the valve closes and forces the oil from the lower end of the cylinder 35 through the by-pass 37 and into the upper end of said cylinder. The passage of oil through the by-pass 37 may be controlled by the valve 38 and consequently the speed with which the piston is allowed to descend, may be varied. In all instances however severe shocks such as those which would otherwise be caused, are prevented.

In connection with the features above described, though usable separately therefrom, I employ a novel brake mechanism controlled by the tongue 4. The numerals 45 designate any adequate brakes on the rear wheels 3, which brakes are controlled by rock shafts 46 in any suitable manner, such as on automobiles. I have shown shaft 46 provided with a crank arm 47 from which a link 48 rises to the rear end of a longitudinal lever 49, said lever being fulcrumed between its ends at 50 on the beams 9 and having its front end loosely connected by a chain or the like 51 with the tongue 4. By this arrangement, when the tongue is depressed below the position occupied thereby when pulling the truck, the lever 49 is rocked in such manner as to apply the brakes 45. The truck may thus be easily controlled by one person, regardless of the weight of the load, and both loading and unloading may be easily accomplished by operating the tongue 4 in such manner as to raise the platform 6 to the most advantageous level.

From the foregoing, taken in connection with the acompanying drawings, it will be seen that although my invention is of comparatively simple and inexpensive nature, it will be highly efficient and in every way desirable, and since excellent results may be obtained from the several details disclosed, they may well be followed. I wish it understood however that within the scope of the invention as claimed, the truck may be embodied in numerous forms other than that shown.

I claim:

1. In an adjustable truck, a wheeled frame having a tongue, a platform, a ratchet wheel mounted on said frame and connected with said platform for raising the same when said wheel is turned, a pawl engaging said ratchet wheel, means controlled by oscillation of said tongue for operating said pawl to turn said wheel, and a releasable dog mounted on said frame and engaging said wheel to hold the platform in raised position.

2. In an adjustable truck, a pair of wheel-carried frames and a pair of longitudinal beams extending between them, a platform above said beams, a shaft mounted on said beams, transverse rock shafts mounted on said frames, means connecting said first named shaft with said rock shafts for turning the latter from the former, cranks on said rock shafts and connections between said cranks and said platform for raising the latter, a ratchet wheel fixedly mounted on said first named shaft between said beams, a pawl engaging said ratchet wheel, a tongue connected with the front frame, means controlled by oscillation of said tongue for operating said pawl to turn said ratchet wheel, and a dog mounted on said beams and engaging said ratchet wheel to hold said platform in raised position.

3. In an adjustable truck, a wheeled frame having a tongue, a platform above said frame, means for raising said platform, including a pawl and ratchet mechanism, a lever on which the pawl of said mechanism is carried, a connecting rod extending forwardly from said lever, and separable coacting means on said frame and said tongue for reciprocating said connecting rod to operate said pawl and ratchet mechanism.

4. In an adjustable truck, a wheeled frame having a tongue, a platform above said frame, means for raising said platform, including a pawl and ratchet mechanism, a lever on which the pawl of said mechanism is carried, a connecting rod extending forwardly from said lever, a lever fulcrumed at the front end of said frame and pivoted to said connecting rod, and means on said tongue for connecting it with said second named lever, whereby oscillation of said tongue may operate said second named lever to actuate said pawl and ratchet mechanism.

5. In an adjustable truck, a wheeled frame having a tongue, a platform above said frame, means for raising said platform, including a pawl and ratchet mechanism, a lever on which the pawl of said mechanism is carried, a connecting rod extending forwardly from said lever, a second lever fulcrumed at the front end of said frame and pivoted to said connecting rod, the front end of said second lever having a socket, and a bolt on said tongue for reception in said socket to connect the tongue and lever in such a manner as to operate the latter from the former.

6. In an adjustable truck, a wheeled frame having a tongue, a platform above said frame, means controlled by manipulation of said tongue for raising said platform, and additional means controlled by said tongue for applying brakes to the wheels of the truck.

7. In an adjustable truck, a wheeled frame having a tongue, a platform above said frame, means controlled by vertical oscillation of said tongue for raising said platform, and means actuated by depression of said tongue beyond a predetermined point, for applying brakes to the wheels of the truck.

In testimony whereof I have hereunto set my hand.

HARRY R. CLARK.